March 15, 1966  A. RICHARDSON  3,239,966
APPARATUS FOR SHARPENING DRILLS
Filed Aug. 20, 1963  5 Sheets-Sheet 1

INVENTOR.
ALLAN RICHARDSON,
BY
McMorrow, Berman & Davidson
ATTORNEYS.

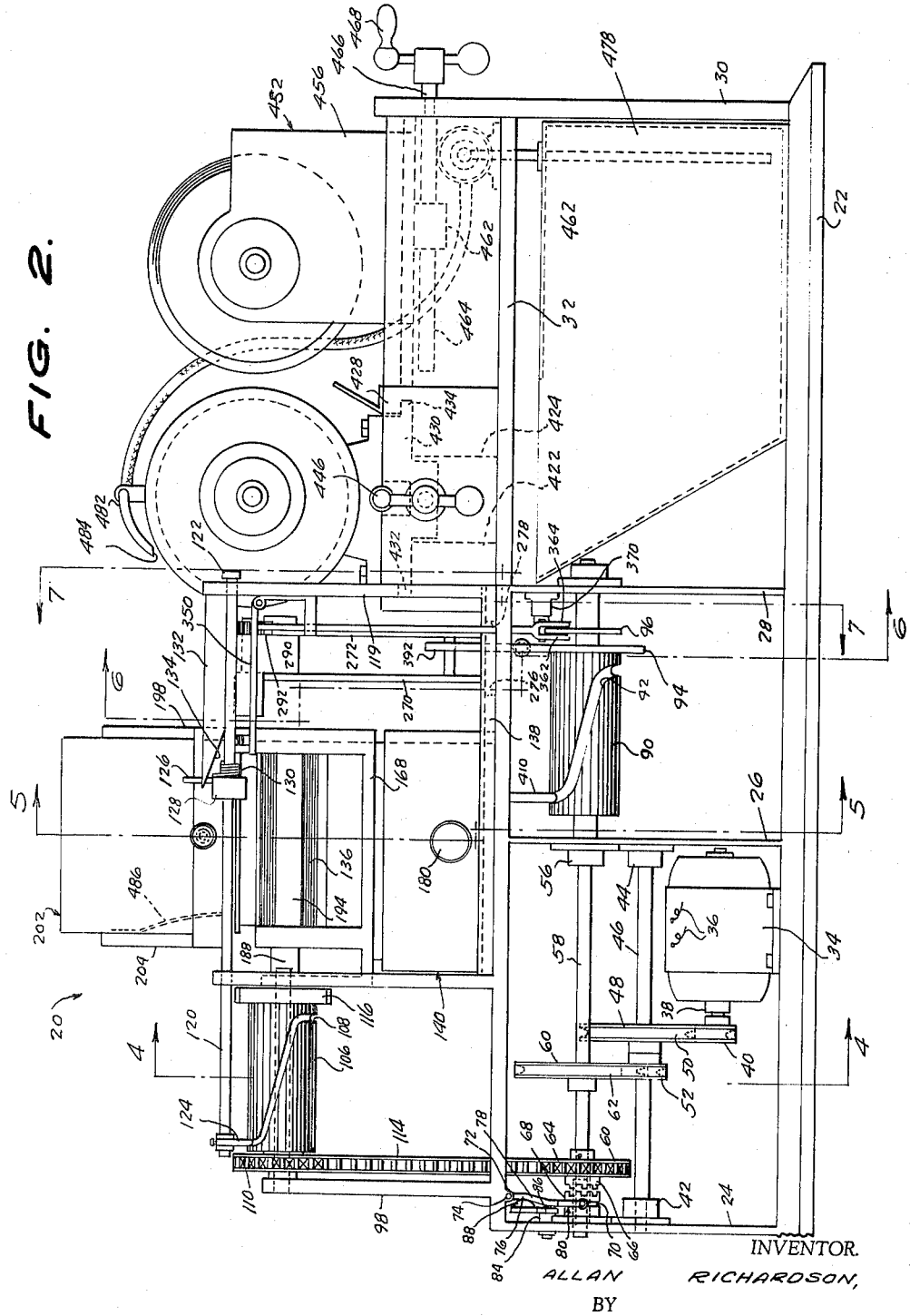

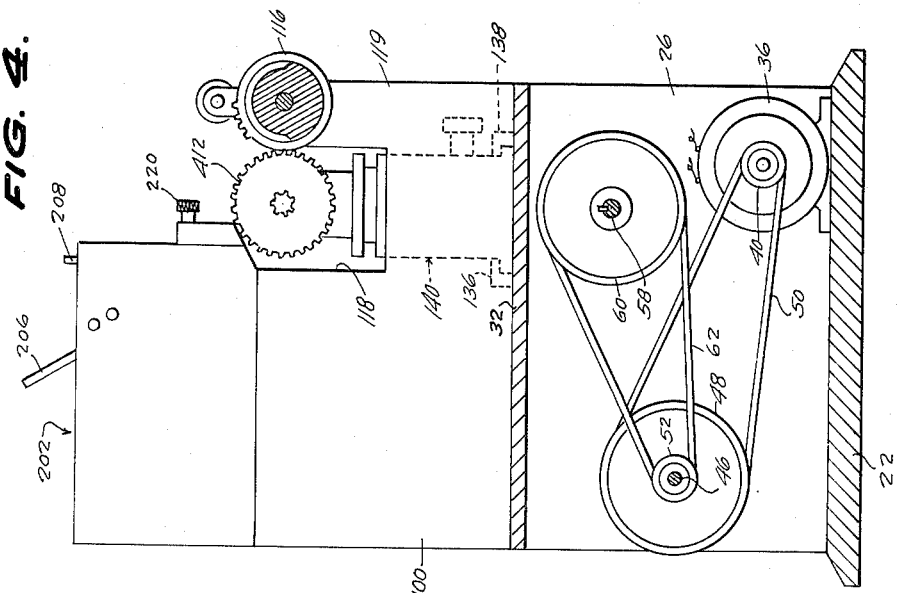
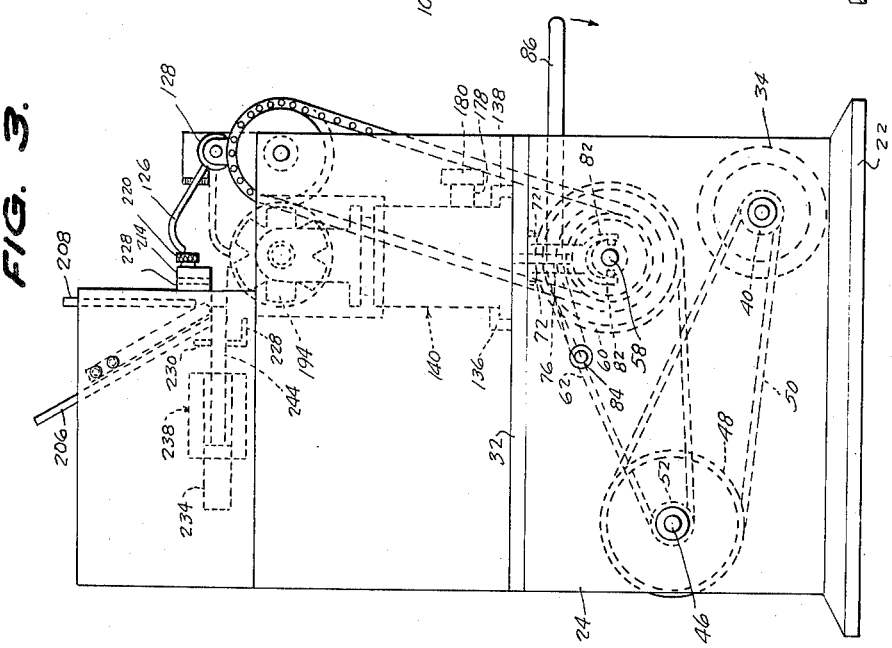

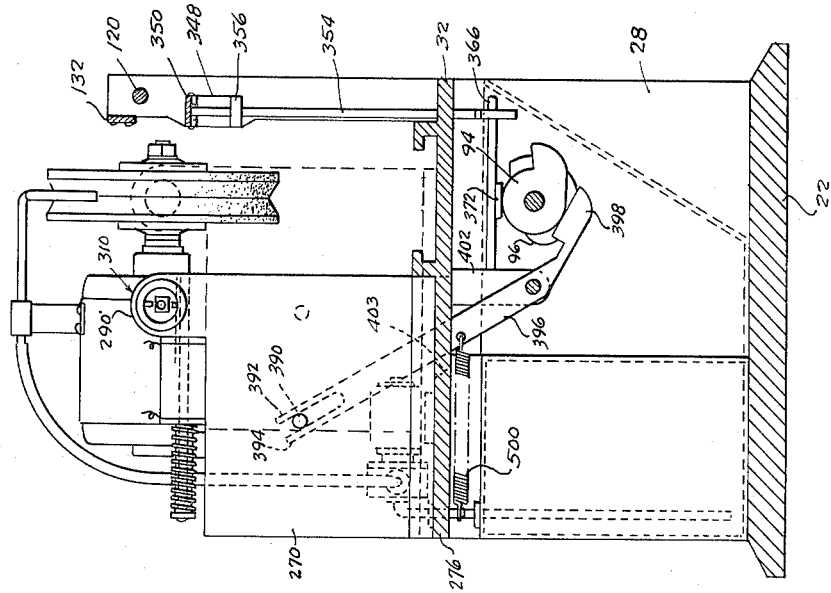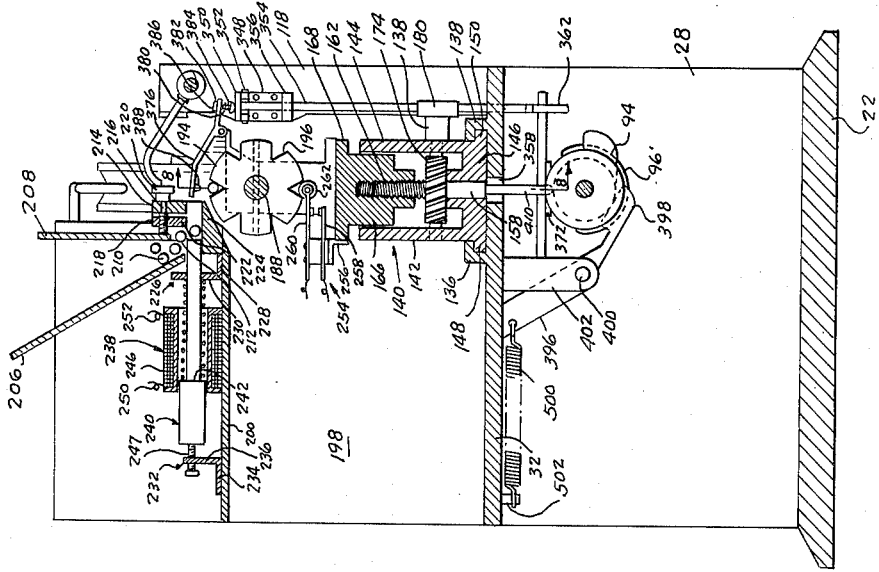

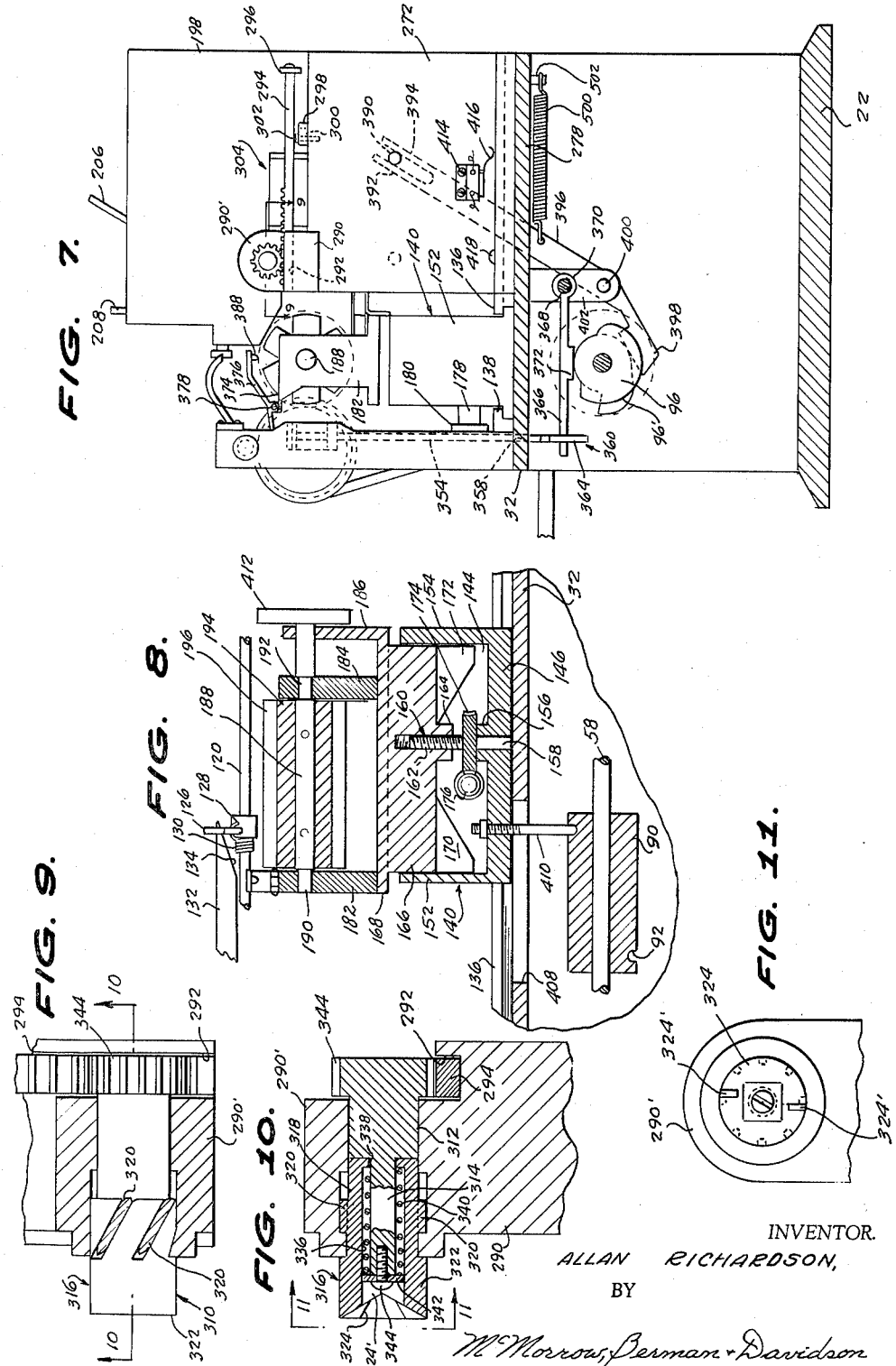

United States Patent Office 3,239,966
Patented Mar. 15, 1966

3,239,966
APPARATUS FOR SHARPENING DRILLS
Allan Richardson, 435 Abiso, San Antonio, Tex.
Filed Aug. 20, 1963, Ser. No. 303,301
4 Claims. (Cl. 51—92)

This invention relates to the general field of the grinding of drill points and, more specifically, the instant invention pertains to apparatus especially designed to rapidly and accurately grind drill points through a sequence of operations in a fully automatic grinding machine.

One of the primary objects of this invention is to provide a fully automatic drill point grinding apparatus which, when loaded with drills to be pointed, requires no further attention from an attendant.

Another object of this invention is to provide apparatus to receive drills, automatically, the points of which are to be sharpened, and align the same with a conventional drill grinding wheel, to move the drill point into engagement with the grinding wheel, and to subsequently remove the drill point from the grinding wheel and discharge the sharpened drill.

A further object of this invention is to provide apparatus for grinding drill points including means to rotate the drill to present the proper surfaces to a grinding wheel.

Still another object of this invention is to provide apparatus for grinding drill points, the apparatus being adjustable to accommodate drills of various diameters and lengths.

This invention contemplates, as a still further object thereof, the provision of drill point sharpening apparatus which is non-complex in construction, assembly and operation, and which is durable in use.

Other and further objects and advantages of the instant invention will become more manifest from a consideration of the following specification when read in conjunction with the annexed drawings, in which:

FIGURE 2 is a side elevational view of the automatic drill sharpening machine shown in FIGURE 1;

FIGURE 3 is an end elevational view of the machine;

FIGURE 4 is a detail cross-sectional view, partly in elevation, FIGURE 4 being taken substantially on the vertical plane of line 4—4 of FIGURE 2, looking in the direction of the arrows;

FIGURE 5 is a detail cross-sectional view, taken substantially on the line 5—5 of FIGURE 2, looking in the direction of the arrows;

FIGURE 6 is a detail cross-sectional view, FIGURE 6 being taken on the line 6—6 of FIGURE 2, looking in the direction of the arrows;

FIGURE 7 is a detail cross-sectional view, FIGURE 7 being taken on the line 7—7 of FIGURE 2, looking in the direction of the arrows;

FIGURE 8 is an enlarged fragmentary, detail, cross-sectional view taken substantially on the vertical plane of line 8—8 of FIGURE 5, looking in the direction of the arrows;

FIGURE 9 is an enlarged detail, fragmentary, cross-sectional view, FIGURE 9 being taken substantially on the horizontal plane of line 9—9 of FIGURE 7, looking in the direction of the arrows;

FIGURE 10 is an enlarged detail, fragmentary, cross-sectional view, FIGURE 10 being taken substantially on the horizontal plane of line 10—10 of FIGURE 9, looking in the direction of the arrows;

FIGURE 11 is an end elevational view, FIGURE 11 being taken substantially on the vertical plane of line 11—11 of FIGURE 10, looking in the direction of the arrows.

Figures 1, 12:
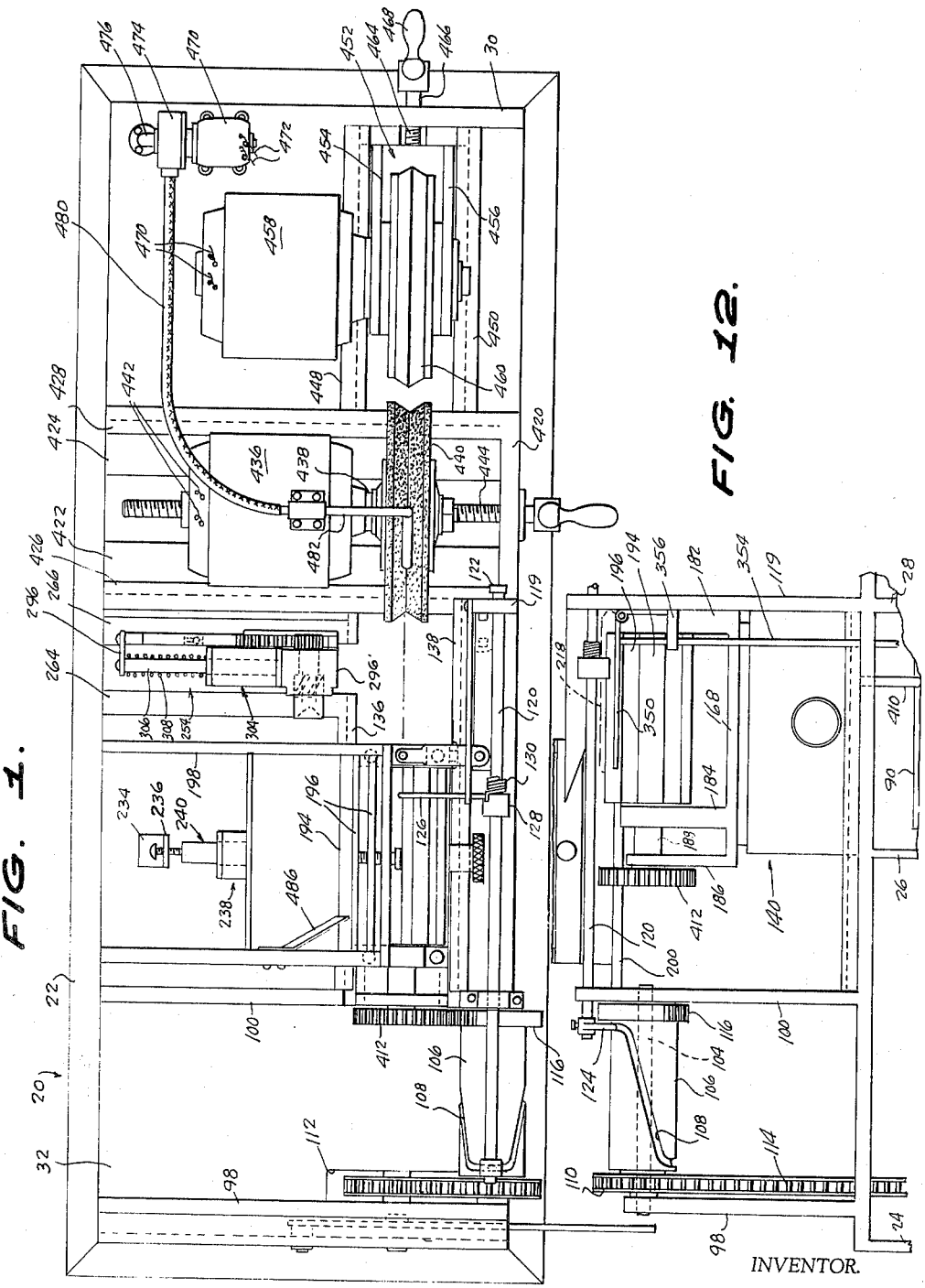
FIGURE 1 is a top plan view of an automatic drill sharpening machine constructed in accordance with this invention, and showing component elements thereof in their respective drill feeding and delivering positions.
FIGURE 12 is a fragmentary side elevational view showing the relationship between certain component elements of the invention when moved to their drill-sharpening positions.

Referring now more specifically to the drawings, reference numeral 20 denotes, in general, an automatic drill-sharpening machine constructed in accordance with the teachings of this invention. As is shown in the drawings, the machine 20 includes an elongated, substantially rectangular base 22 having fixedly secured thereto adjacent one end thereof an upright substantially rectangular end wall 24. At longitudinally-spaced intervals, the base 22 is also provided with a plurality of upright substantially rectangular divider walls 26, 28 having substantially the same dimensions as those of the end wall 24. To the opposite end of the base 22 is fixedly connected an upright substantially rectangular end wall 30. Extending across the upper ends of the end and divider walls 24 and 26, 28 respectively, and fixedly connected thereto is an elongated substantially rectangular platform 32 having an end abutting against and fixedly connected to the end wall 30.

A constant-speed electric motor 34 is fixedly secured to the base 22 between the end wall 24 and the divider wall 26, the electric motor 34 connecting through a cable 36 with a suitable source of electric power (not shown). The drive shaft 38 of the motor 34 has a pulley 40 fixedly connected thereon for rotation therewith.

Aligned journals 42, 44 are secured to the end wall 24 and the divider wall 26 and support therebetween the opposed ends of an elongated shaft 46 for rotation therein. Fixedly secured to the shaft 46 for rotation therewith is a pulley 48 and an endless belt 50 is trained about the pulleys 40, 48. As is seen in FIGURE 3, the shaft 46 is disposed adjacent one longitudinally-extending side of the base 22 and has fixedly secured thereto a second pulley 52. The drive shaft 38 and the shaft 46 have parallel longitudinally-extending axes.

A second pair of aligned journals 54, 56 are also secured to the end and divider walls, 24 and 26, respectively, and support the opposed ends of a shaft 58 for rotation therein. The shaft 58 is located adjacent the other side of the base 22 and extends parallel to the shaft 46. Fixedly secured on the shaft 58 for rotation therewith is a pulley 60 aligned with the pulley 52, and trained about these two pulleys is an endless pulley belt 62. A conventional sprocket 64 is loosely mounted on the shaft 58, the sprocket 64 having a clutch hub 66 integrally formed therewith. A clutch collar 68 of conventional construction is mounted on the shaft 58 for rotation therewith and axial movement relative thereto. The clutch collar 68 has the usual circumferential groove 70 formed therein.

Reference numeral 72 (see FIGURES 1 and 3) denotes a pair of bosses which depend from the underside of the platform 32 adjacent the end wall 24. The bosses 72 support the opposed ends of a horizontally-disposed pivot pin 74, and one end of an arm 76 is pivotally supported on the pivot pin 74. At this point it should be noted that the longitudinal axis of the pivot pin 74 is substantially perpendicular with respect to the longitudinal axis of the shaft 58. The arm 76 is offset laterally at 78 toward the end wall 24 and terminates in a bifurcated lower end 80 (see FIGURE 2) which includes the oppositely-disposed arms 82 (see FIGURE 3) which slidably engage within the groove 70 of the clutch collar 68. Pivotally connected on the end wall 24 on a stub shaft 84 is one end of an elongated lever 86 (see FIGURES 2 and 3) having a bumper 88 juxtaposed with respect to the offset portion 78, the bumper 88 being adapted to engage the offset portion as the lever 86 is moved downwardly about its stub shaft 84 to cause the arm 76 to pivot toward the right, as viewed in FIGURE 2. This effects engagement of the collar 68 with the hub 66 to establish a driving relation between the shaft 58 and the sprocket 64.

As will be seen in the drawings, the shaft 58 extends longitudinally of the base 22 and has one of its ends journalled for rotation in the divider wall 28. On the shaft 58, intermediate the divider walls 26, 28, is a barrel cam 90 fixedly secured thereto for rotation therewith. The barrel cam 90 has a cam groove 92 formed in the exterior side thereof to serve a purpose to be described.

Also mounted on the shaft 58 adjacent the divider wall 28 are two cam discs 94, 96 to which further reference will be made.

The platform 32 has arising therefrom three longitudinally-spaced substantially-rectangular and parallel walls 98, 100, 102. Extending between and journalled for rotation in the walls 98, 100 adjacent the upper ends thereof is a shaft 104 on which is fixedly secured for rotation therewith a second barrel cam 106 having a continuous cam groove 108. Carried on the shaft 104 and secured for rotation thereon adjacent one end thereof is a sprocket 110 aligned with the sprocket 64. The platform 32 includes a slot 112 confronting and registering with both sprockets 64 and 110, the slot 112 receiving therethrough an endless sprocket chain 114 which is trained about the two sprockets 64, 110, the two sprockets having a gear ratio of 1:1. The shaft 104, at its other end adjacent the wall 100, has a fragmentary spur gear 116 fixedly secured thereon for rotation therewith. For reasons to follow, the wall 100 is provided with a downwardly-extending, substantially U-shaped recess 118, and laterally-spaced from an edge of the wall 102 and parallel therewith in an upstanding standard 119.

Extending between the wall 100 and the standard 119 and journaled for rotation and reciprocation in the upper ends thereof is an elongated shaft 120 having a headed end 122. The other end of the shaft 120 has fixedly connected thereto a cam follower rod 124 which is adapted to engage and ride in the groove 108 and to track the same.

The shaft 120 also has secured thereon a drill hold-down finger 126 mounted for pivotal movement about the longitudinal axis thereof, the hold-down finger 126 having an end thereof secured to a collar 128 rotatably supported on the shaft 126 and spring-biased at 130 to move in a clockwise direction, as viewed in FIGURE 3. Also fixedly secured on the standard 118 is an elongated lever 132 having an upwardly and outwardly-projecting cam undersurface 134 at one end thereof disposed in the path of movement of the finger 126. Thus, as the cam follower 124 tracks the groove 108, the shaft 120 will reciprocate and, in moving to the right, as viewed in FIGURES 1 and 2, will move the holddown finger 126 below the cam undersurface 134 causing the finger 126 to turn counterclockwise, reference being made to FIGURE 5. Movement of the shaft 126 in the opposite direction eventually effects release of the finger 126 from the cam surface 134 which permits it to return to its original position under the bias of the spring 130.

The platform 32 is provided with a pair of longitudinally-extending, upwardly-projecting, inverted L-shaped tracks 136, 138 (see FIGURES 1, 5, 6, 7 and 8). A substantially-hollow rectangular carriage is designated at 140 and includes oppositely-disposed, laterally-spaced, upright, elongated substantially-parallel rectangular sidewalls 142, 144 connected at their respective lower ends by elongated, substantially-rectangular slide plate 146. The sidewalls 142, 144 are provided, on the remotely-disposed sides thereof, with laterally-projecting diverging tongues 148, 150 which slidably engage within the tracks 136, 138, respectively (see FIGURE 5). The carriage 140 is closed at its opposed ends by substantially-rectangular upright, longitudinally-spaced and substantially-parallel end walls 152, 154 (see FIGURE 8).

Intermediate its ends, the slide plate 146 is provided with an upstanding, substantially-hollow cylindrical boss 156 in which is journaled for rotation the lower unthreaded portion 158 of a rod 160 having a threaded upper end 162. The upper end 162 of the rod 160 is threadedly received within a substantially-hollow, internally-threaded boss 164 subtended from a vertically-adjustable, elongated, substantially-rectangular block 166 that telescopically engages within the side and end walls 142, 144 and 152, 154, respectively. The block 166, adjacent its upper end, is formed with a continuous peripheral flange 168 which is adapted to engage against the upper ends of the side and end walls 142, 144 and 152, 154, respectively, to limit the downward movement of the block 166.

The block 166 is also provided with substantially-triangular, reversely-turned, depending guide flanges 170, 172 disposed on opposite sides and ends thereof for sliding engagement with the side walls 142, 144, respectively (see FIGURES 5 and 8).

Fixedly secured to the rod 160 intermediate its ends is a worm gear 174 which is threadedly engaged by a worm shaft 176 having an end 178 rotatably journaled in the side wall 144 and which projects laterally therefrom and exteriorly of the carriage 140, the projecting end terminating in an enlarged knurled manually-operable knob 180.

Reference numerals 182, 184 and 186 connote longitudinally-spaced, substantially-rectangular and parallel upright standards that are secured at their respective lower ends to the block 166. As is seen in FIGURES 1, 2, 8 and 12, a shaft 188 spans these standards and includes axially-spaced necked-down portions 190, 192 which are journaled for rotation in the standards 182, 184 with one end of the shaft being journaled for rotation in the standard 186 and which projects beyond the remotely-disposed side thereof. Fixedly secured on the shaft 188 for rotation therewith and extending axially thereof between the standards 182, 184, is an elongated, substantially-cylindrical drill-receiver drum 194 having axially-extending V-shaped slots 196 formed therein.

Reference numeral 198 denotes an upright substantially-rectangular panel which projects away from the platform 32 intermediate the ends thereof. Extending between and fixedly secured to the support wall 100 and the wall 118 (see FIGURES 5 and 12) is an elongated, substantially-rectangular mounting plate 200. The mounting plate 200 supports a drill-receiving hopper indicated at 202, and it is seen that the upper end of the wall 118 serves as one end wall therefor. Fixedly secured to the mounting plate 200 and longitudinally-spaced from the wall 118 is an opposed end wall 204 of the hopper 202. Located between the upper end of the wall 118 and the end wall 204 is an elongated, substantially-rectangular back wall 206 which is downwardly-inclined toward the drum 194. Extending substantially vertically with respect to the mounting plate 200 and laterally-spaced from the back wall 206 is a substantially-rectangular front wall 208 having its opposed ends fixedly secured to the upper end of the wall 118 and the end wall 204.

As is seen in FIGURE 5, the lower edge of the front wall 208 is vertically-spaced from the mounting plate 200 as at 210, to permit the passage of drills 212 which are to be sharpened to pass thereunder. Extending longitudinally between and secured to the wall 118 and end wall 204 is an elongated, substantially-rectangular plate 214. The plate 214 is located adjacent the lower edge 210 of the front wall 208, and has journaled for rotation therein a non-threaded portion 216 of an elongated threaded screw 218 having a manually-adjustable screwhead 220. Disposed between and slidably engaged in adjacent sides of the wall 118 and the end wall 204 is an elongated, substantially-rectangular sizing bar 222 which extends below and spans the lower edge 210 of the front wall 208. As is seen in FIGURE 5, the screw 218 is threaded into the bar 222 in order that the bar 222 may be moved toward or away from the front wall 208, thereby controlling the size of the drills 212 which pass under the lower edge 210 of the front wall 208. The mounting plate 200, at that side thereof adjacent the drum 194, is increased in thickness to form an elongated, substantially-rectangular drill rest 224 which extends partially over the drum 194 in vertically-spaced relation relative thereto. The drill rest 224 is adapted to receive the drills 212 from the hopper 202.

Reference numeral 226 denotes, in general, an L-shaped guide bracket having a foot portion 228 fixedly secured to the mounting plate 200, and a centrally-apertured, vertical leg portion 230. A second L-shaped bracket 232 has its foot portion 234 fixedly connected to the mounting plate 200 and has a vertical leg portion 236 which extends parallel to the leg portion 230 in spaced relation relative thereto.

Disposed between the brackets 226, 232 and also secured to the mounting plate 200, is an electromagnet 238 having a reciprocable armature 240, the armature 240 being necked-down at 242 to form a shoulder, and an end portion 244 which is adapted for reciprocation through the leg portion 230 of the bracket 226.

A helicoidal spring 246 surrounds the extension 244 of the armature 240 and is interposed between the shoulder 242 and the leg portion 230 of the bracket 226 in such manner that the armature 240 is constantly biased for movement to the left, as viewed in FIGURE 5, that is, toward the bracket 232.

The leg portion 236 of the bracket 232 has an adjustment screw 247 threaded therethrough and coaxially aligned with the armature 240. The screw 247 is adapted to engage in the outer end of the armature 240, and the adjustment screw 247 will determine the throw of the armature 240 and this setting is made in accordance with the diameters of the drills which are to be sharpened.

As is seen in the drawings, the armature extension 244 of the armature 240 reciprocates below the lower edges of the back wall 206 and the front wall 208 of the hopper 202 and is movable across the drill rest 224. Energization of the electromagnet 238 will cause the armature 240 to move in the direction of the front wall 208 and to engage against a single drill 212 which has been dispensed from the hopper 202, coming to rest upon the rest 224. Upon de-energization of the electromagnet 238, the armature 240 moves in the opposite direction under the influence of the spring 246. The action of the armature 240, when the electromagnet 238 is energized, causes the engaged drill 212 to be pushed off the rest 224 and to drop into the immediately-adjacent upwardly-facing slot 196 formed in the drum 194. It will be immediately understood that as this ejection of the drill 212 takes place, the armature extension 244 extends across the bottom end of the front and back hopper walls 206, 208, respectively, to effectively prevent one or more additional drills to drop upon the rest 224 until the extension 244 has been withdrawn under the influence of the spring 246.

The electromagnet 238 is connected in series with a suitable electric power source (not shown) through the lines 250, 252 with a micro-switch 254. The switch 254 is mounted on a laterally-offset inverted L-shaped bracket 256 (see FIGURE 5) which is secured to the flange 168 of the block 166. The switch 254 includes a fixed switch arm 258 and a flexible movable switch arm 260, both being disposed below, but proximate to the drum 194. The arm 260 on the outer end thereof has rotatably mounted thereon a roller 262 disposed within the path of movement of the drum 194. The flexible switch arm 260 is resilient and is so biased as to effect movement of the roller 262 into an adjacent one of the slots 196 so as to open the switch 254. The roller 262 is adapted to move out of the adjacent one of the slots 196 for contact with the exterior side of the drum 194, and at this time, the switch 254 is closed, thereby establishing an electrical circuit to the electromagnet 238 effecting energization thereof. Of course, when the roller 262 moves into one of the slots 196, thus opening the switch 254, the electromagnet 238 is de-energized.

Reference numerals 264, 266 connote a pair of inverted L-shaped tracks disposed adjacent the panel 198 and which intersect the track or rail 136, intermediate its ends and at substantially right angles with respect thereto. At 270, 272 are designated a pair of laterally-spaced, substantially-parallel upright side walls forming a part of a carriage 274. The lower ends of the side walls 270, 272 are provided with outwardly-diverging tongues 276, 278 which are adapted to slide in the tracks 264, 266.

The side walls 270, 272 are held in laterally-spaced relation by means of a spacer block 290 adjacent their respective upper ends, and the block 290 is grooved at 292 (see FIGURES 2, 7 and 9) to slidably receive a rack gear 294 therein. The rack gear 294 substantially overlies the side wall 272 and carries an abutment plate 296 (see FIGURE 7) at one end thereof. The plate 296 is adapted to strike an abutment block 298 adjustably mounted on the side wall 272 through a conventional slot and screw arrangement 300, 302, respectively, to limit the movement of the rack gear 294 in one direction.

Mounted on the upper ends of the side walls 270, 272 and fixedly connected thereto is an electromagnet 304 having an armature 306 to the outer end of which is also connected the abutment plate 296. Extending between the abutment plate 296 and the adjacent end of the electromagnet 304, and surrounding the armature 306 is a helicoidal spring 308 which is under compression. This constantly biases the armature for movement outwardly away from the electromagnet 304.

The block 290 includes an integral raised boss 290' in which a drill chuck 310 is mounted for rotation. The chuck 310 includes an elongated, transversely-extending shaft 312 rotatably supported in the boss 290'. The shaft 312 is reduced in diameter at one of its ends 314 and receives therearound a drill centering sheath 316.

The sheath 316 comprises a main body portion 318 from which laterally project a plurality of radially-spaced ribs 320 disposed at an acute angle relative to the longitudinal axis of the main body portion 318. The main body portion 318 is enlarged at its outer end or cap 322 and is formed with an inwardly-extending coaxial frusto-conical recess 324 which continues inwardly from the plane of the frustum in an elongated square passage 336 in which the reduced end 314 of the shaft 312 is received in spaced relation relative thereto. The inner end of the main body portion is closed by an apertured end wall 338 through which the reduced end 314 of the shaft 312 extends. Surrounding the reduced end 314 of the shaft 312 is a helicoidal spring 340 under compression and having an end thereof abutting against the end wall 338, and its other end engaging against a square stop plate 342 secured to the outer end of the reduced end 314 of the shaft 312 by means of a screw 344. The stop plate 342 is telescopically received within the passage 336, and the chuck 310 is now seen to rotate with the shaft 312 and may be reciprocated relative to the reduced end 314 thereof. As is seen in FIGURES 10 and 11, the cap 322 has formed therein a pair of diametrically-opposed recesses 324', the recesses 324' being substantially rectangular in configuration and extending inwardly from the frusto-conical recess 324.

The other end of the shaft 312 has a spur gear 346 fixedly secured thereon or which is formed integral therewith, the gear 344 meshing with the rack gear 294.

The standard 119 has secured thereto the foot 348 of a hinge plate 350 which is pivotally connected thereto at one end thereof on pivot pin 352. The underside of the hinge plate 350 is engaged by a push rod 354 that reciprocates through a guide member 356 projecting laterally from the standard 119. The lower end of the push rod 354 extends through an opening 358 formed in the platform 32 (see FIGURES 5 and 7) and extends therebelow to terminate in bifurcated arms 362, 364. The bifurcated arms 362, 364 embrace one end of a lever 366 pivotally connected at its other end on a horizontal pivot pin 368 carried on a hanger bracket 370 which projects laterally from the divider wall 28 (see FIGURES 2 and 7). The underside of the lever 366 has fixedly secured thereto a wear plate 372. The wear plate 372 rests on the cam 96. Thus, as the high side 96' of the cam 96 rides under the wear plate 372, the free end of the lever 366 pivots upwardly, raising the push rod 354 and consequently, the free end of the plate 350.

The standard 182 (reference being made to FIGURE 7) has integrally formed at the upper end thereof an offset shoulder 374 on which a bell-crank lever 376 is pivotally mounted at 378 intermediate its ends. As is seen in FIGURE 5, one end 380 of the lever 376 extends transversely across and over the plate 350 intermediate its ends and has depending therefrom and reciprocable therethrough a rivet 382 spring-biased at 384 for movement toward its lowermost position. As shown in this figure, the spring 384 extends between the plate-engaging head 386 and the end 380 of the lever 376. The other end of the lever 376 has secured thereto a depending drill flute-engaging detent 388 (see FIGURES 5 and 7).

The side walls 270, 272 are connected by a separator pin 390 that is engaged between the bifurcated arms 392, 394 (see FIGURES 6 and 7) of an elongated L-shaped lever 396 having a cam-engaging offset end 398. The lever 396 is pivotally supported on a pivot pin 400 which is, in turn, subtended from the platform 32 by a hanger bracket 402. The end 398 is adapted to track the periphery of the cam 94. The lever 396 extends through the platform 32 in a suitable slot 403 (see FIGURE 6) formed therein.

The platform 32 is provided with an elongated, substantially-rectangular slot 408 to receive therethrough the lower end of a cam-tracking pin 410 which has its upper end threadedly connected to the slide plate 146 of the carriage 140. The extreme outer end of the tracking pin 410 is adapted to engage and trace the groove 92 formed in the drum cam 90. It is obvious from the foregoing discussion that as the drum cam 90 rotates with the shaft 58 the pin 410 will be caused to move in the track 92 and to effect a longitudinal movement of the carriage 152 relative to the platform 32. As this movement takes place, a spur gear 412 mounted on one of the ends of the shaft 188 is moved into and out of engagement with the fragmentary gear 116 to serve a purpose to be described. The ratio between the fragmentary gear 116 and the spur gear 142 is 6:1.

Fixedly secured to the side wall 272 is a normally open micro-switch 414 connected with a suitable power supply (not shown). The switch 414 includes a vertical movable switch arm 416, the switch 414 normally being in its open position. A protuberance 418 extends from the rail 266 adjacent an end thereof and is disposed in the path of movement of the switch arm 416 to effect a closing of the switch 414 as the carriage 274 is moved in one direction. Movement of the carriage 274 in the the reverse direction disengages the switch arm 416 from the protuberance 418 to return the switch 414 to its normally open position.

Reference numeral 420 designates a front face plate (see FIGURE 1) which projects upwardly from and extends longitudinally of the platform 32. As is seen in this figure, the face plate 420 extends across the adjacent pair of ends of laterally-spaced, transversely-extending blocks 422, 424 mounted on the platform 32. The blocks 422, 424 are integral with upwardly-projecting confronting rails 426, 428, respectively. A motor-mounting slide block 430 is provided with a pair of laterally-spaced, longitudinally-extending side flanges 432, 434, the flanges 432, 434 slidably engaging beneath the rails 426, 428. The block 430 has an electric motor 436 secured thereto, and on the drive shaft 438 thereof is mounted a V-shaped drill-sharpening wheel 440. Lines 442 connect the motor 436 with a suitable source of E.M.F.

An elongated screw 444 extends through the plate 420 and is threaded into the block 430, the screw 444 having a handle 446 secured to one end thereof. Action of the handle 446 causes the screw 444 to rotate in one direction or the other, whereby the block 430 and the elements associated therewith are drawn toward or pushed away from the plate 420. Extending between the block 424 and the end wall 30 and projecting upwardly from the platform 32 are a pair of track members 448, 450 between which is slidably mounted an upright carriage 452. The carriage 452 includes upright side walls 454, 456, and an electric motor 458 is fixedly secured to the side wall 454.

The drive shaft (not shown) of the motor 458 connects with a V-shaped stone crusher wheel 460 which is adapted to clean and re-face the drill-sharpening wheel 440.

To the underside of the block 452 is secured an internally-threaded collar 462 which is adapted to receive the threaded end 464 of a shaft 466. As is seen in FIGURES 1 and 2, the shaft 466 projects through the upper end of the end wall 30 and has a handle 468 fixedly secured thereto. Rotation of the handle 468 in one direction or the other causes the wheel 460 to move toward or away from the drill-sharpening wheel 440.

The motor 458 is energized through the lines 470 which are connected with any suitable source of electrical power.

As is seen in FIGURES 1 and 2, a motor 471 is supported on the platform 32, the motor 471 being energized through lines 472 which are also connected with a suitable source of electric power. The motor 471 drives a conventional pump 474, and the inlet side thereof is connected through a conduit 476 with a fluid source. In this instance, the fluid source is contained within a receptacle 478 supported on the base 22 below the platform 32 and disposed between the divider wall 28 and the end wall 30. The outlet side of the pump 474 connects through conduit 480 with an L-shaped discharge nozzle 482 having its terminal end 484 disposed directly above and in spaced relation relative to the apex of the wheel 440.

Fixedly secured to the side wall 204 and projecting inwardly and downwardly therefrom is a resilient tongue 486, the function of which will be stated below.

Having described and illustrated the component elements of this machine in detail, its operation will be set forth below.

Assuming that the elements of the machine 20 are as shown in FIGURES 1 and 2, the hopper 202 is empty and prepared to receive a plurality of drills which are to be sharpened. The operator then turns the screw 218 in one direction or the other to vary the width of the discharge opening at the bottom of the hopper 202 by changing the position of the bar 228. The adjustment is such that only one drill 212 is permitted to pass under the lower edge 210 of the front wall 208 at a time.

It will be understood that the armature extension 244 now extends below the open lower end of the hopper 202 to block the descent of more than one of the drills 212 to the rest 224.

Assuming that the motor 34 is energized through the leads 36, the shaft 46 will rotate and in so rotation, the shaft 58 is also turned. This, of course, causes rotation of the drum cam 90 and of the cam members 94, 96, but since the sprocket chain 114 is not moving, the drum cam 106 remains inactive.

Assuming, further, that the motor 436 is energized to turn the drill-sharpening wheel 440 and that the motor 470 is also energized to supply a lubricant from the container 478 to the wheel 440, the operator forces the handle 86 downwardly, in the direction of the arrow as shown in FIGURE 3, thereby causing the engagement of the clutch collar 68 with the clutch hub 66 whereby the sprocket 64 is placed in driving connection with the shaft 58. This places the sprockets 64 and 110 in driving relation relative to one another through the sprocket chain 114. The drum cam 106 thus starts its rotation.

Assuming still further that the roller 262 is presently disposed within one of the V-shaped grooves of recesses 196 of the drum 194, the roller 262 will be displaced outwardly from the recess or groove 196, causing the switch 254 to close. As the switch 254 closes, the electromagnet 238 is energized causing the extension 244 of the armature 240 to move toward the right as viewed in FIGURE 5 to displace one of the drills 212 from the rest 224 and pass the same into one of the grooves or recesses 196. As this feeding or delivering of one of the drills 212 to the drum 194 takes place, the cam follower member 124 traces a dwell portion of the cam track 108.

The drum 194 has an axial length lesser than the axial length of the drills 212 whereby as the same are discharged from the hopper 202 to the drum 194, the end of the drill 212 to be sharpened projects beyond the adjacent end of the drum 194. As soon as the roller 262 engages within the next succeeding one of the grooves or recesses 196, the switch 254 is opened, causing deenergization of the electromagnet 238 whereupon the armature extension 244 of the armature 240 is retracted under the influence of the spring 246, permitting the next one of the drills 212 to descend and come to rest on the rest 224.

Now, as the cam follower element 124 continues to trace the cam groove 108, the shaft 120 is forced to move toward the right, as viewed in FIGURES 1 and 2, thereby causing the hold-down finger 126 to engage the cam surface 134 of the lever 132. This engagement results in the downward-turning movement of the finger 126 against the bias of spring 130 and forces the finger 126 into engagement with the drill 212 now held in the uppermost one of the grooves or recesses 196.

During the feeding or delivery time of the drill 212 to the drum 194, and during the dwell period of the cam follower 124 on the cam drum 106, the cam follower element 410 is also in its dwell position in the cam track 92 of the drum 90. Now, as the finger 126 closes against the drill 212, the cam follower element 410 begins to track the active portion of the cam track 72 of the drum 90, and this, in turn, causes the carriage 140 to begin its movement toward the right, as viewed in FIGURES 1 and 2.

As this movement is initiated, the offset end 398 of the lever 396 begins to engage the high side of the cam 94 to effect pivotal movement of the lever 396 in a counterclockwise direction as viewed in FIGURE 7. This causes the carriage 254 to move in the direction of the drum 194. The carriage 254 continues to move in the aforesaid direction until the chuck 316 is disposed in confronting relation relative to the uppermost one of the grooves or recesses 196, and the cam follower 110 continues to track the cam groove 92 forcing the drill 212 into the chuck 316. As the end 398 of the lever 396 brings the carriage 254 to its maximum position relative to the drum 194, the switch arm 416 of the microswitch 414 is engaged by the protuberance 418, thereby closing the switch 414 and establishing a circuit to the electromagnet 304. Energization of the electromagnet 304 causes the armature 306 to retract against the bias of the spring 308, and in so moving, the armature 306 causes the rack gear 294 to move to the left, as viewed in FIGURE 7. The rack gear 294, in so moving, effects rotation of the spur gear 344 which, in turn, effects rotation of the chuck 316, the drill point of the drill 212 having been now engaged within the frusto-conical recess 324. The chuck 316 now extends outwardly and the drill point of the drill 212 is now received within the frusto-conical recess 324 with the flutes (not shown) thereof engaging within the rectangular passages 324'. This engagement causes the drill to be turned about its longitudinal axis to properly position the drill point for reception in the drill-sharpening wheel 440.

As soon as the drill is properly positioned for engagement with the wheel 440, the offset portion 398 of the lever 396 drops off the high side of the cam 96, and under the influence of the spring 500 which connects with the lever 396 above the pivot pin 400 and with the anchor pin 502 the lever 396 begins to pivot clockwise as viewed in FIGURE 7. This causes the protuberance 418 to move from under the switch arm 416 whereby the switch 414 is opened, thus de-energizing the electromagnet 304. The armature 306 of the electromagnet 304 returns to its original extended position and in so moving, causes the rack gear 294 to move in the opposite direction. Upon the maximum throw of the chuck 316 and the subsequent de-energization of the electromagnet 304, the chuck disengages from the drill point of the drill 212 and is moved to its full-line position shown in FIGURES 9 and 10 under the influence of the spring 340.

As soon as the drill 212 has been properly positioned in the groove or recess 196 formed in the drum 194, the high side of the cam 96 engages the wear plate 372 to force the free end of the lever 366 to pivot upwardly (reference being made to FIGURES 5, 6 and 7) which, in turn, causes the push rod 354 to also move upwardly. As this movement takes place, the plate 350 is also pivoted upwardly against the spring-biased rivet 382 to cause the bell-crank lever 376 to turn in a counterclockwise direction as viewed in FIGURE 5. In so moving, the detent 388 is pivoted downwardly to engage in a flute (not shown) formed in the drill 212 and firmly locks the drill 212 against any rotation about its longitudinal axis.

The carriage 140 continues its movement to the right, as viewed in FIGURES 1 and 12, until the drill point engages against the sharpening wheel 440. The cam track 92 is so shaped as to provide a short dwell while the drill point of the drill 212 is being sharpened, after which the pin 410 continues to track the groove 92 in such a manner as to cause the carriage 140 to move toward the left toward its original starting position. As the carriage 140 begins its return movement, the lever 366 descends the low side of the cam 96, whereby the plate 350 is permitted to descend under the force of gravity, and this action results in the removal of the detent 388 from the drill flute and the escape of the finger 126 from beneath the cam surface 134 of the member 132.

It will be appreciated that during all of the aforedescribed operations the shaft 104 has continued to rotate, thereby driving the gear 116. The gear 116 is now moved, upon the return of the carriage 140, to engage and mesh with the gear 412 to restore the machine 20 to its original condition.

Re-engagement of the gear 412 with the gear 116 causes the drum to rotate through another arc of 60° to bring the next one of the recess 196 directly in position below the rest 224. As this movement takes place, the switch 254 is again closed, and the cycle of operation is repeated.

As the groove or recess 196 which originally received the first of the drills 212 passes through and beyond an arc of 90°, the sharpened drill 212 is discharged therefrom and falls through gravity into a discharge chute (not shown) for storage within a collecting hopper (not shown). The chute and storage hopper form no part of this invention and hence, are not shown nor described in detail for the same are conventional.

The block 166 is raised or lowered through the operation of the screw 174, depending upon the diameters of the drills 212 which are received within the hopper 202.

Having described and illustrated one embodiment of this invention in detail, it will be understood that the same is offered merely by way of example, and that this invention is to be limited only by the scope of the appended claims.

What is claimed is:

1. A drill point sharpening machine comprising a frame, an elongated drum mounted for rotation on said frame, means on said drum to receive and hold a drill with the drill point of said drill extending beyond an end of said drum, means on said frame engageable with said drill to prevent axial shifting movement of said drill relative to said drum, means on said frame engageable with said drill to prevent rotation of said drill about its longitudinal axis, and means on said frame connected with said drum to shift said drum axially to effect engagement and disengagement of said drill point with a drill point sharpening wheel.

2. A drill point sharpening machine comprising a frame, an elongated cylindrical drum mounted for rotation on said frame, said drum having a plurality of longitudinally-extending grooves formed therein, means on said frame to supply the uppermost one of said grooves with a drill the point of which is to be sharpened, said point extending beyond the adjacent end of said drum, means on said frame for extension into said uppermost one of said grooves to engage said drill and prevent said drill from shifting longitudinally in said groove, means extending into said uppermost one of said grooves and engageable with a flute of said drill to prevent said drill from rotating about its longitudinal axis, and means on said frame connected with said drum to shift said drum toward and away from a drill point sharpening wheel to effect engagement and disengagement of said drill point with said wheel.

3. A drill sharpening machine comprising an elongated substantially open frame, an elongated substantially cylindrical drum mounted for rotation on said frame, said drum having a plurality of axially-extending V-shaped grooves formed therein and spaced circumferentially thereabout, hopper means for storing said drills, said hopper means being mounted on said frame above said drum, electromagnetic means for ejecting one of said drills from said hopper for discharge into the uppermost one of said grooves, means on said frame engageable with said drill to prevent said drill from shifting axially, means on said frame engageable with a flute of said drill to prevent said drill from rotating about its longitudinal axis, and means on said frame connected with said drum to shift said drum toward and away from a drill point sharpening wheel.

4. A drill point sharpening machine comprising a frame, an elongated substantially cylindrical drum mounted for rotation on said frame, said drum having a plurality of axially-extending circumferentially-spaced grooves formed therein, hopper means mounted on said frame and supported above said drum, electromagnetic means disposed beneath said hopper and operable to control the discharge of said drills from said hopper and to eject the same onto the uppermost one of said grooves, means on said frame engageable with the point of said drill to turn said drill for proper presentation to a drill point sharpening wheel, a drill hold-down finger pivotally supported on said frame and having a free end pivotal into said uppermost one of said grooves to engage the drill therein, cam means engageable with said finger to effect the pivotal movement thereof, a carriage, cam-actuated means for effecting movement of said carriage perpendicular to the longitudinal axis of said drill, drill chuck means mounted on said carriage, said drill chuck means including means for advancing said chuck to meet said drill to turn said drill for proper presentation to a drill point sharpening wheel, said cam means being effective to reverse the movement of said carriage to remove said chuck from the direction of travel of said drill, and means mounted on said support and connected with said drum to effect reciprocable movement of said drum toward and away from said drill point sharpening wheel.

References Cited by the Examiner

UNITED STATES PATENTS

| | | | |
|---|---|---|---|
| 1,106,692 | 8/1914 | Wincrantz | 51—219 |
| 1,547,032 | 7/1925 | Crane | 51—219 |
| 2,384,899 | 9/1945 | Dixon | 51—219 |
| 2,386,742 | 10/1945 | MacNeill | 51—108 |
| 2,591,893 | 4/1952 | Trippel | 51—108 |

ROBERT C. RIORDON, *Primary Examiner.*